US006305122B1

(12) United States Patent
Iwao et al.

(10) Patent No.: US 6,305,122 B1
(45) Date of Patent: Oct. 23, 2001

(54) MOSQUITO KILLING APPARATUS AND MOSQUITO TRAPPING APPARATUS

(75) Inventors: Kenzou Iwao, Nagoya; Kiyoshi Makiya, Kitakyushu; Tetsuya Aoki; Yoshihiro Inoue, both of Kasugai, all of (JP)

(73) Assignees: Chuba Electric Power Co., Inc.; Chuba Seiki Co., Inc., both of Aichi-prefecture (JP)

( * ) Notice: Subject to any disclaimer, the term of this patent is extended or adjusted under 35 U.S.C. 154(b) by 0 days.

(21) Appl. No.: 09/311,724

(22) Filed: May 14, 1999

(30) Foreign Application Priority Data

Jun. 9, 1998 (JP) ................................. 10-176711

(51) Int. Cl.[7] ................................. A01M 1/22
(52) U.S. Cl. ................................. 43/112
(58) Field of Search ............... 43/107, 111, 112, 43/113, 114

(56) References Cited

U.S. PATENT DOCUMENTS

| | | | | |
|---|---|---|---|---|
| 4,506,473 | * | 3/1985 | Waters | 43/107 |
| 4,551,941 | * | 11/1985 | Schneidmiller | 43/107 |
| 4,876,822 | * | 10/1989 | White | 43/114 |
| 5,189,830 | * | 3/1993 | Montemurro | 43/121 |
| 5,205,064 | * | 4/1993 | Nolen | 43/112 |
| 5,382,422 | * | 1/1995 | Dieguez | 43/111 |
| 5,417,009 | * | 5/1995 | Butler | 43/113 |
| 5,669,176 | * | 9/1997 | Miller | 43/139 |
| 5,813,166 | * | 9/1998 | Wigton | 43/107 |

FOREIGN PATENT DOCUMENTS

| | | |
|---|---|---|
| 60-44577 | 3/1985 | (JP) . |
| 2-49877 | 4/1990 | (JP) . |
| 7-203821 | 8/1996 | (JP) . |

* cited by examiner

Primary Examiner—Kurt Rowan
(74) Attorney, Agent, or Firm—Arent Fox Kintner Plotkin & Kahn, PLLC (57) ABSTRACT

A mosquito killing apparatus includes an electroshock unit to which a high voltage applies, a heater to generate heats, a carbon dioxide ($CO_2$) gas introduction inlet connected to discharging portions for discharging carbon dioxide ($CO_2$) gas around the electroshock unit, and a protection cover provided outside the electroshock unit for covering the electroshock unit. The carbon dioxide ($CO_2$) gas introduction inlet can be connected to carbon dioxide ($CO_2$) gas generating means of various types, and a carbon dioxide ($CO_2$) gas staying unit is formed around the electroshock unit to stay the carbon dioxide ($CO_2$) gas introduced from the carbon dioxide ($CO_2$) gas introduction inlet to surely electrocute attracted mosquitoes.

2 Claims, 9 Drawing Sheets

MOSQUITO KILLING APPARATUS AND MOSQUITO TRAPPING APPARATUS

BACKGROUND OF THE INVENTION

1. Field of the Invention

This invention relates to a mosquito killing apparatus and a mosquito trapping apparatus in which mosquitoes are attracted through the use of heat and carbon dioxide (CO2) gas indoors as well as outdoors for exterminating mosquitoes safely and effectively.

2. Description of Related Art

Mosquitoes, typical harmful flying insects, are attracted by bodily temperature of human beings and carbon dioxide discharged from respiration. They belong to an insect group of unfavorable and are most harmful as sucking blood of human beings. To exterminate those mosquitoes, various apparatus and devices such as mosquito-repellent incenses, electronic mosquito-repellent devices, electric shock mosquito killers, and so on have been proposed.

For example, "an electroshock insecticide device" disclosed in Japanese Utility Model Publication Showa No. 60-10,388 is constituted of an electroshock net to which a high voltage is applied, a fluorescent lamp for generating near ultraviolet light, a far-infrared heater for generating heat, a means for attracting insects made of a carbon dioxide (CO2) gas container or the like, a housing containing the electroshock net, the fluorescent lamp, the far-infrared heater, and the carbon dioxide (CO2) gas container and having an front opening, an insect receiving tray arranged below the housing, and a barrier net for covering the electroshock net so as not to expose the electroshock net outside. The fluorescent lamp is attached to a rear wall of the housing and emits light including spectrum having wavelength of 3,000 to 4,000 angstroms. The far-infrared heater is a far-infrared radiation body for radiating heats including spectrums having wavelength of 7 to 10 microns. The carbon dioxide (CO2) gas container is a means for generating carbon dioxide (CO2) gas intermittently where a solenoid pushes a nozzle for controlling spraying of the carbon dioxide (CO2) gas. The means for attracting insects attracts mosquitoes inside the device, and the device kills the mosquitoes by an electric shock from the electroshock net.

Moreover, "a mosquito attracting trap device" set forth in Japanese Unexamined Patent Publication Heisei No. 6-46 is constituted of a trap container in a rectangular shape placed on an installation surface, an entrance formed at a lower half on a side surface of the trap container for letting mosquitoes in, a sticky agent layer formed inside of the trap container, and an enticing means composed of a heater provided inside the trap container and a carbon dioxide (CO2) gas generating means. The heater as the enticing means for mosquitoes is made by a portable body warmer lapped with a used sock, whereas the carbon dioxide (CO2) gas generating means is a cylindrical cup filled with water to which a calcium carbonate tablet is put to produce carbon dioxide (CO2) gas, and the carbon dioxide (CO2) gas is fed inside the trap container through holes formed in a lid of the cup. The carbon dioxide (CO2) gas introduced into the trap container entices mosquitoes upon flowing out of the entrance formed on the side surface of the trap container, and the enticed mosquitoes are captured by the sticky agent layer formed on the inner surface of the trap container and die later.

However, the above conventional device raises the following problems. First, the electroshock insecticide device includes the carbon dioxide (CO2) gas generator as a structural element, and because such a generator is incorporated in the device, the device has to be larger and expensive but cannot select the carbon dioxide (CO2) gas generating means depending on purpose of use or place for installation of the device. Because the electroshock insecticide device, as well as the mosquito attracting trap device, does not have any function to stay the generated carbon dioxide (CO2) gas around the apparatus, the generated carbon dioxide (CO2) gas disperses in the air, thereby attenuating the enticing effects for mosquitoes. To keep the enticing effects for mosquitoes, the carbon dioxide (CO2) gas is continuously supplied, so that the costs for generating carbon dioxide (CO2) gas becomes very expensive. Even if the enticing means successfully attracts mosquitoes near the device, the mosquitoes may stop, e.g., at the vicinity of the device, so that there is no guarantee to kill by electroshock or trap the mosquitoes at the electroshock net or the death region on the sticky agent layer.

SUMMARY OF THE INVENTION

It is an object of the invention, for solving the above problems, to provide a novel mosquito killing apparatus and mosquito trapping apparatus which allows a carbon dioxide (CO2) gas generating means as an attracting means for mosquitoes to be selectable as a separate body depending on use, reduce the costs for generating carbon dioxide (CO2) gas, and kill or capture the attracted mosquitoes with a very high rate.

The foregoing objects are accomplished by a mosquito killing apparatus according to the invention which includes an electroshock unit to which a high voltage applies, a heater for generating heats, discharging means for discharging carbon dioxide (CO2) gas around the electroshock unit, a carbon dioxide (CO2) gas introduction inlet capable of connecting with an arbitrary carbon dioxide (CO2) gas generating means for generating carbon dioxide (CO2) gas, the carbon dioxide (CO2) gas introduction inlet being coupled to the discharging means, a protection cover arranged outside the electroshock unit for covering the electroshock unit, and a carbon dioxide (CO2) gas staying unit provided around the electroshock unit for staying the carbon dioxide (CO2) gas introduced from the carbon dioxide (CO2) gas introduction inlet around the electroshock unit.

In one form of the mosquito killing apparatus, the heater is placed inside the electroshock unit; the discharging means coupled to the carbon dioxide (CO2) gas introduction inlet supplies carbon dioxide (CO2) gas inside the electroshock unit; the carbon dioxide (CO2) gas staying unit is formed as to be upright around the electroshock unit; the carbon dioxide (CO2) gas discharged from the inside of the electroshock unit through the discharging means flows around the electroshock unit upon being heated by the heater and stays at the carbon dioxide (CO2) gas staying unit.

In another aspect of the invention, a mosquito killing apparatus includes an electroshock unit to which a high voltage is applied, a heater for generating heat, and a protection cover arranged outside the electroshock unit for covering the electroshock unit, wherein the electroshock unit, the heater, and the protection cover are placed on a ceiling in a house for animals and birds.

In yet another aspect of the invention, a mosquito killing apparatus includes a casing having one opening on an exterior side of the casing and the other opening on an interior side of the casing to render gas communication between the one opening and the other opening, the casing being adapted to be mounted on an installation aperture formed on a wall of a house, an electroshock unit, to which a high voltage applies, disposed in the casing, a heater disposed in the casing for generating heat, and a protection cover arranged inside the casing but outside the electroshock unit for covering the electroshock unit.

In a further aspect of the invention, a mosquito trapping apparatus includes a sticky body having a sticky surface to trap mosquitoes on at least an external surface of the sticky body, a heater for heating the sticky body, discharging means for discharging carbon dioxide (CO2) gas around the sticky body, a carbon dioxide (CO2) gas introduction inlet capable of connecting with an arbitrary carbon dioxide (CO2) gas generating means for generating carbon dioxide (CO2) gas, the carbon dioxide (CO2) gas introduction inlet being coupled to the discharging means, a protection cover arranged outside the sticky body for covering the sticky body, and a carbon dioxide (CO2) gas staying unit provided around the sticky body for staying the carbon dioxide (CO2) gas introduced from the carbon dioxide (CO2) gas introduction inlet around the sticky body.

In another form of the invention, a mosquito trapping apparatus includes a sticky body having a sticky surface to trap mosquitoes on at least an external surface of the sticky body, the sticky body being disposed as pending from a ceiling in a house, and a heater for heating the sticky body.

In a preferred embodiment of the invention, the heater and/or either of the electroshock unit and sticky body has a lower lightness than anywhere else in the apparatus.

BRIEF DESCRIPTION OF THE DRAWINGS

The above and other objects and features of the invention are apparent to those skilled in the art from the following preferred embodiments thereof when considered in conjunction with the accompanied drawings, in which.

DETAILED DESCRIPTION OF PREFERRED EMBODIMENTS

Figure 1:
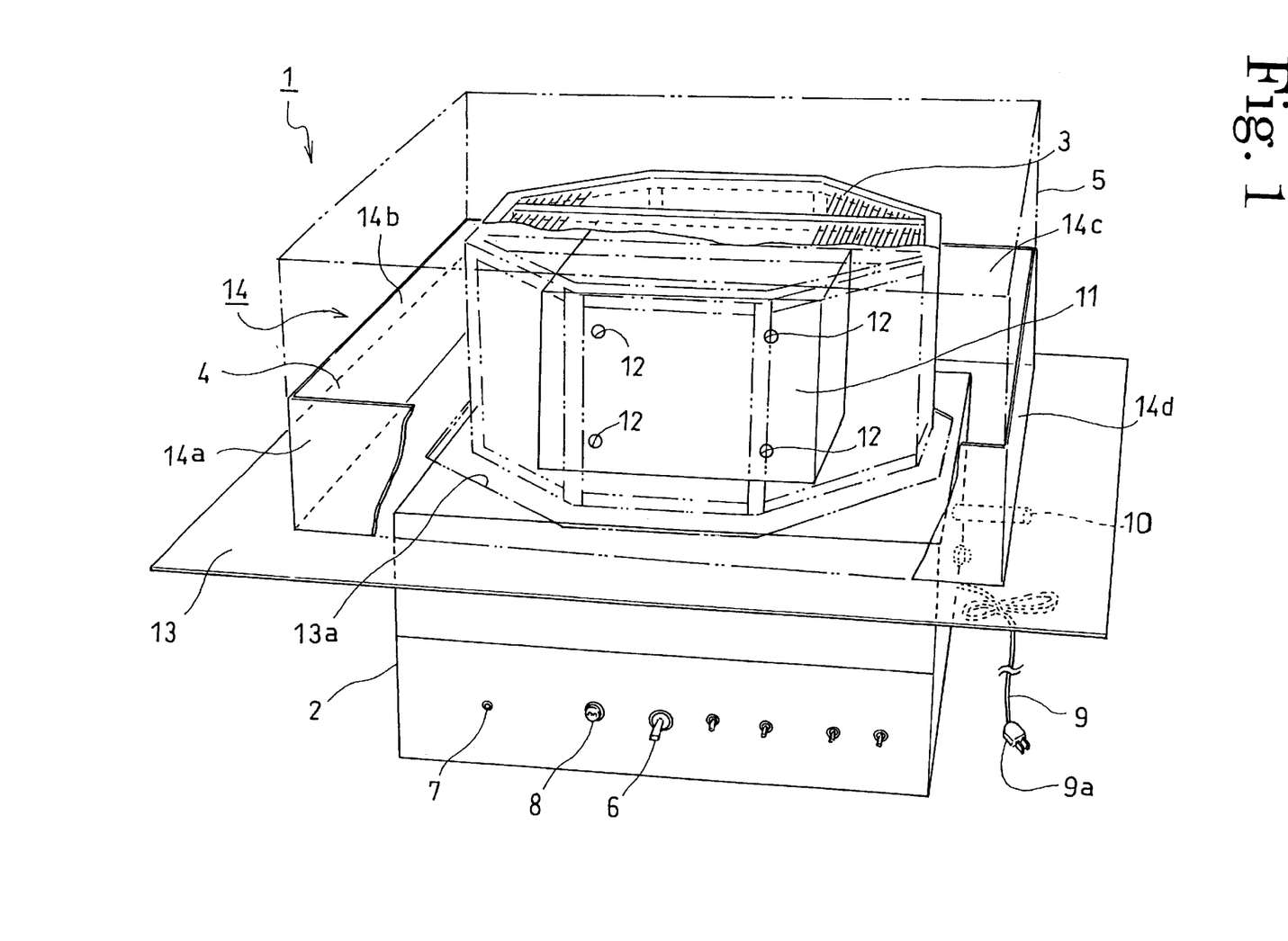
FIG. 1 is a perspective view showing a mosquito killing apparatus according to a first embodiment of the invention.

Referring to FIGS. 1 to 4, a mosquito killing apparatus according to the first embodiment of the invention is described in detail. This mosquito killing apparatus 1 is an apparatus for killing mosquitoes, one of most harmful insects to human beings, with an electrical means. The mosquito killing apparatus 1 as shown in FIG. 1 includes a casing 2 installed or mounted at any place such as on the ground, under the eaves, on the floor, etc., an electroshock unit 3 mounted on the top surface of the casing 2, a carbon dioxide (CO2) gas staying unit 4 for staying carbon dioxide (CO2) gas introduced externally as described above, and a protection cover 5 formed around the electroshock unit 3.

Figure 2:
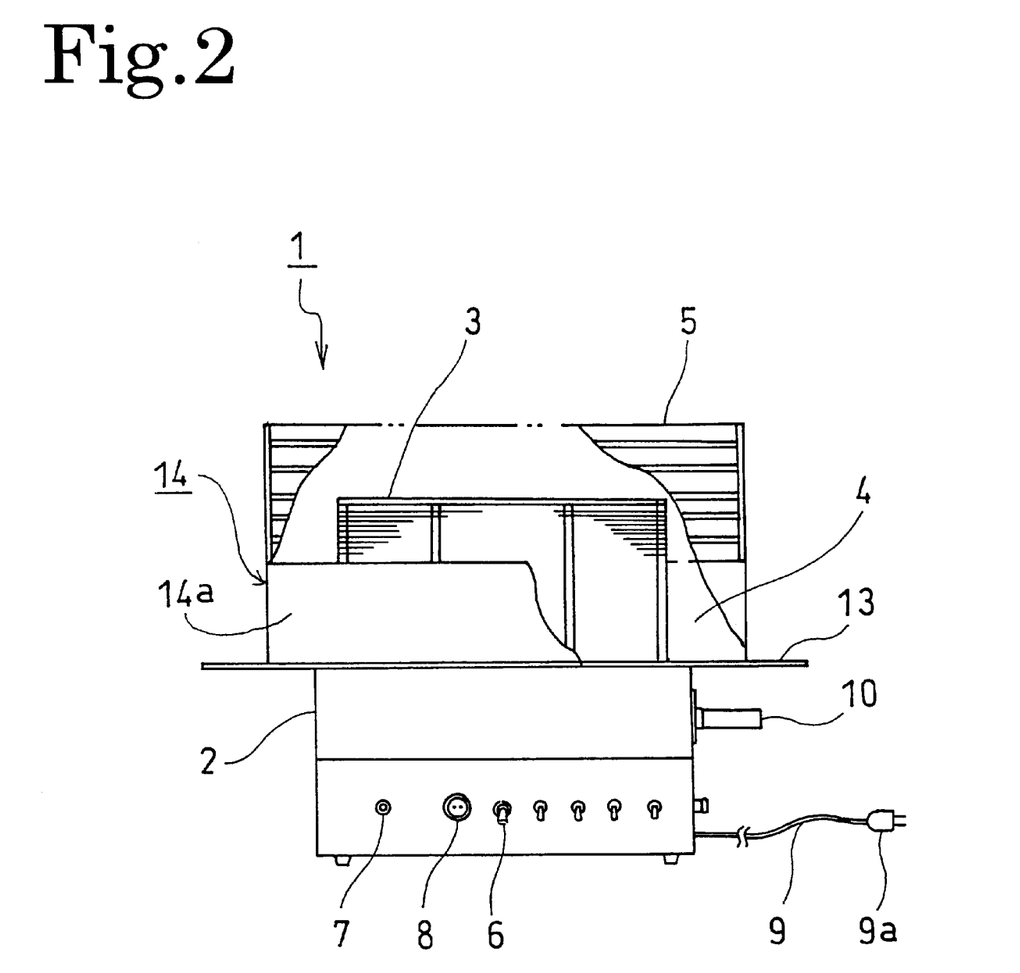
FIG. 2 is a front view showing the mosquito killing apparatus according to the first embodiment.
Figure 3:
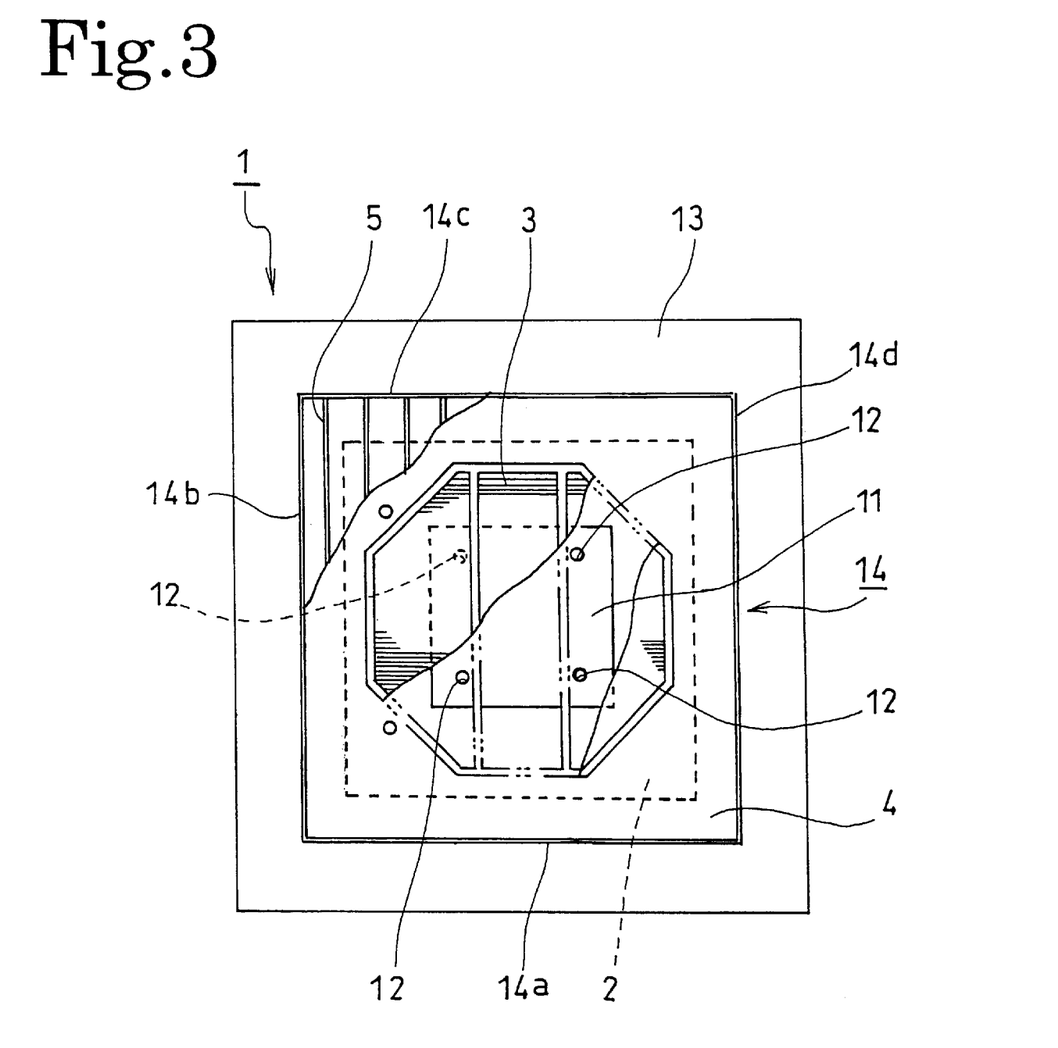
FIG. 3 is a plan view showing the mosquito killing apparatus according to the first embodiment.

The casing 2 is formed in a rectangular shape using a thin metal plate, and at least the exterior of the casing 2 is painted in white. A power source switch 6, a pilot lamp 7, and a fuse 8 are provided in front of the casing 2 as shown in FIG. 2. A power source cord 9 whose tip is formed with an AC consent plug 9a, and a tube 10 serving as a carbon dioxide (CO2) gas introduction inlet are secured on a side of the casing 2. The tube 10 is a member for connecting to a high pressure carbon dioxide (CO2) gas container, not shown, through a hose, not shown, and for supplying carbon dioxide (CO2) gas brought form the carbon dioxide (CO2) gas container or generated in a container to a heat dissipation box as described below. The electroshock unit 3 is formed on the top surface of the casing 2. The electroshock unit 3 is, as shown in FIG. 3 when seen from a top, in an octagonal shape and includes a frame coated in a black color, and a plurality of metal lines disposed in a mesh or grid shape with 0.5 mm pitch in the frame. The heat dissipation box 11 is formed, as shown in FIG. 1 and FIG. 3, inside the electroshock unit 3. The heat dissipation box 11 has a rectangular shape whose external surfaces are coated in a black color. The electric heater 17 (see, FIG. 4) is installed in the heat dissipation box 11. The electric heater and 17 serves as a heater and as a structural element of the invention. A high voltage generating circuit as described below is formed below the electric heater 17 to apply a high voltage to the electroshock unit 3. The heat dissipation box 11 is in gas communication with the interior of the casing 2, and the carbon dioxide (CO2) gas supplied form the carbon dioxide (CO2) gas container is supplied to the interior of the heat dissipation box 11. Plural carbon dioxide (CO2) gas discharging openings 12, which serve as discharging means, are formed in the top surface and the side surfaces of the heat dissipation box 11 to flow out the carbon dioxide (CO2) gas supplied inside the heat dissipation box 11.

A square flange plate 13 molded of a transparent resin is formed on the top surface of the casing 2. An insertion hole 13a in an octagonal shape is formed at a center of the flange plate 13 as shown in FIG. 1 for inserting the electroshock unit 3. On a top surface of the flange plate 13, a frame 14 is placed as to surround the electroshock unit 3 and to be made with a lower height than that of the electroshock unit 3. The frame 14 is unitedly molded of a transparent resin, is a square frame member as shown in FIG. 3 when seen as the plan view, and is constituted of first to fourth upright plates 14a to 14d, each having a rectangular shape as shown in FIG. 1. It is to be noted that a space surrounded by inner peripheral surfaces of the rectangular upright plates 14a to 14d, the top surface of the flange plate 13, and an outer peripheral surface of the heat dissipation box 11 serves as the carbon dioxide (CO2) gas staying unit 4. The protection cover 5 is detachably attached onto the top surface of the frame 14. The protection cover 5 is formed as to cover the vicinity of the electroshock unit 3 and made of a net having intervals through which mosquitoes can easily enter in the inside but fingers of human beings are not allowed to pass. Two switches to which power is supplied upon attachment of the protection cover 5 are provided on the casing 2 as described below, and the electroshock unit 3 does not receive any high voltage while the protection cover 5 is removed. The protection cover 5 is coated in white.

Figure 4:
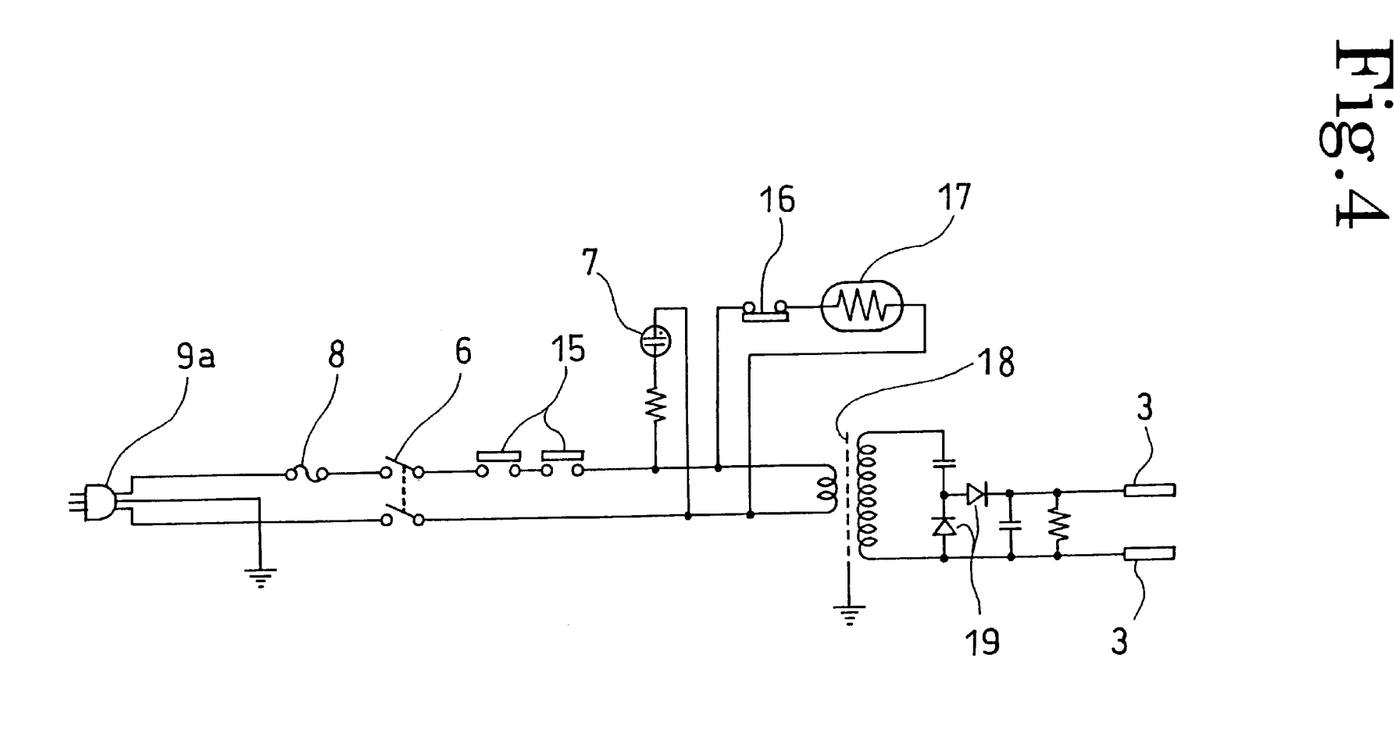
FIG. 4 is a circuit diagram showing the mosquito killing apparatus according to the first embodiment.

An electric circuit of this apparatus including such a high voltage generating circuit is described briefly. This circuit is structured as shown in FIG. 4 to boost up the supplied power AC 100V with an insulation transformer 18, thereby applying a high voltage to the electroshock unit 3. In FIG. 4, numeral 15 is a switch for protection cover detection; numeral 16 is a thermostat; numeral 18 is an insulation transformer; numeral 19 is a rectifier. The electrical cord 9 is connected to the alternating current power source, and when the power source switch 6 is turned on, the pilot lamp 7 goes on, and the electric heater 17 is turned, on thereby generating heat. The temperature of the electrical heater 17 can be automatically controlled by a method opening and closing the circuit in response to the temperature change in a certain range by the thermostat 16. The currents boosted up by the insulation transformer 18 are converted into a direct current, thereby applying a high voltage to the electroshock unit 3. When the switch 15 for protection cover detection cannot detect the protection cover 5, e.g., when the protection cover 5 is removed or improperly set, the high voltage will not be applied to the electroshock unit 3 even if a power source switch 6 is turned on, because the circuit is made open.

Now, a use method of this mosquito killing apparatus 1 is briefly described. First, in regard with the installation place for the mosquito killing apparatus 1, it should be anywhere the apparatus is surely powered notwithstanding indoors and outdoors, such as inside a house or in a garden of a house. After this mosquito killing apparatus 1 is installed at a proper installation place, the electrical cord 9 is connected to the power source, and the power source switch 6 is turned on. Subsequently, the high pressure carbon dioxide (CO2) gas container not shown is connected to the tube 10 by a hose not shown, thereby supplying in carbon dioxide (CO2) gas in the heat dissipation box 11. With this manipulation, the electric heater 17 is powered, and a high voltage is supplied to an electroshock unit 3. The vicinity of the mosquito killing apparatus 1 is heated by this control to heat the carbon dioxide (CO2) gas and the air located around the apparatus, which are discharged to the outside through the carbon dioxide (CO2) gas discharging openings 12 bored in the heat dissipation box 11. The discharged carbon dioxide (CO2) gas flows outside through the mesh of the electroshock unit 3 as well as stays in the carbon dioxide (CO2) gas staying unit 4. Because the specific gravity of the carbon dioxide (CO2) gas is heavier than that of the air, the carbon dioxide (CO2) gas discharged around the vicinity of the electroshock does not disperse in the open air immediately but stays there with a concentration of a certain degree though not forever. Thus, the carbon dioxide (CO2) gas and heat are generated around the mosquito killing apparatus 1, thereby enticing mosquitoes near the mosquito killing apparatus 1. The mosquitoes enticed by the carbon dioxide (CO2) gas and the heat die upon contacting with the electroshock unit 3 to which the high voltage applies.

Accordingly, the mosquito killing apparatus 1 thus structured can be placed anywhere as far as the power supply is ensured; the apparatus can very effectively attract mosquitoes by a combination of carbon dioxide (CO2) gas and heat; the apparatus also can operate inexpensively without requiring carbon dioxide (CO2) gas in a large amount because the carbon dioxide (CO2) gas staying unit 4 prevents the carbon dioxide (CO2) gas from dispersing in an early stage.

The mosquito killing apparatus 1 according to this first embodiment is structured as a separate body from the carbon dioxide (CO2) gas container as the carbon dioxide (CO2) gas generating means, and the carbon dioxide (CO2) gas is introduced inside through the tube 10, so that the apparatus itself can be made compact and inexpensive. Although in this embodiment an example in which the carbon dioxide (CO2) gas container is connected to the tube 10 through a hose, not shown, is described, various type carbon dioxide (CO2) gas generating means can be selectively used such as dry ices, an apparatus for generating carbon dioxide (CO2) gas by chemical reaction between calcium carbonate and water, etc. as far as it can be connected to the tube 10 by the hose. That is, this mosquito killing apparatus 1 can be used upon properly selecting one of the carbon dioxide (CO2) gas generating means in association with the use object or installation place of the apparatus. The mosquito killing apparatus 1 has the heat dissipation box 11 and the frame of the electroshock unit 3 coated in a black color which easily produces radiation heats and has a larger radiation amount of infrared ray, and in a meantime, the casing 2 and the protection cover 5 are white while the flange plate 13 and the frame 14 are transparent, so that they commonly produce less radiation heats and are colors having a smaller radiation amount of infrared ray. Therefore, the attracted mosquitoes stop at the electroshock unit 3 without stopping at the frame 14 and the protection cover 5, thereby enabling the enticed mosquitoes to be electrocuted with great certainty.

Figure 5:
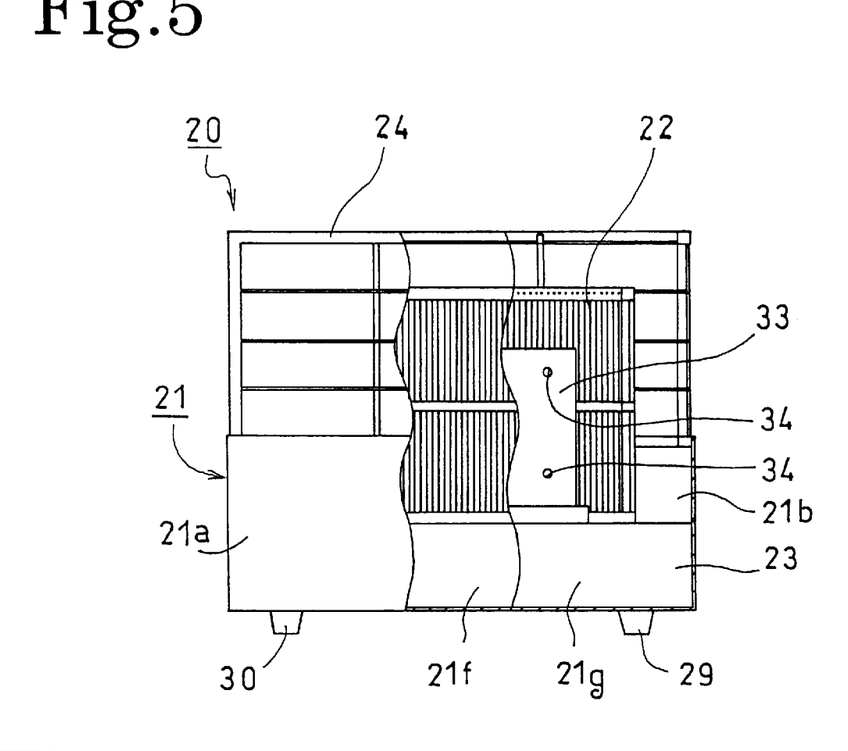
FIG. 5 is a front view showing a mosquito killing apparatus according to a second embodiment of the invention.
Figure 6:
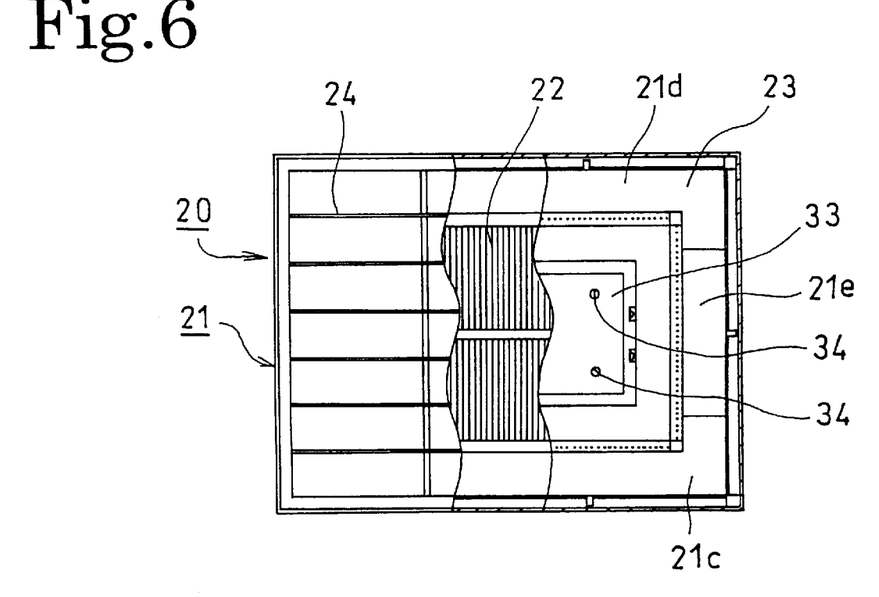
FIG. 6 is a plan view showing the mosquito killing apparatus according to the second embodiment.

A mosquito killing apparatus 20 according to a second embodiment is described next. The mosquito killing apparatus 20 is formed in a rectangular shape as a whole configuration, as shown in FIG. 5 or FIG. 6. The mosquito killing apparatus 20, as well as the mosquito killing apparatus 1 according to the first embodiment, includes a casing 21, an electroshock unit 22 mounted on the top surface of the casing 21, a carbon dioxide (CO2) gas staying unit 23 formed around the electroshock unit 22 inside the casing 21 for staying carbon dioxide (CO2) gas, and a protection cover 24 formed at a top end of the casing 21.

Figure 8:
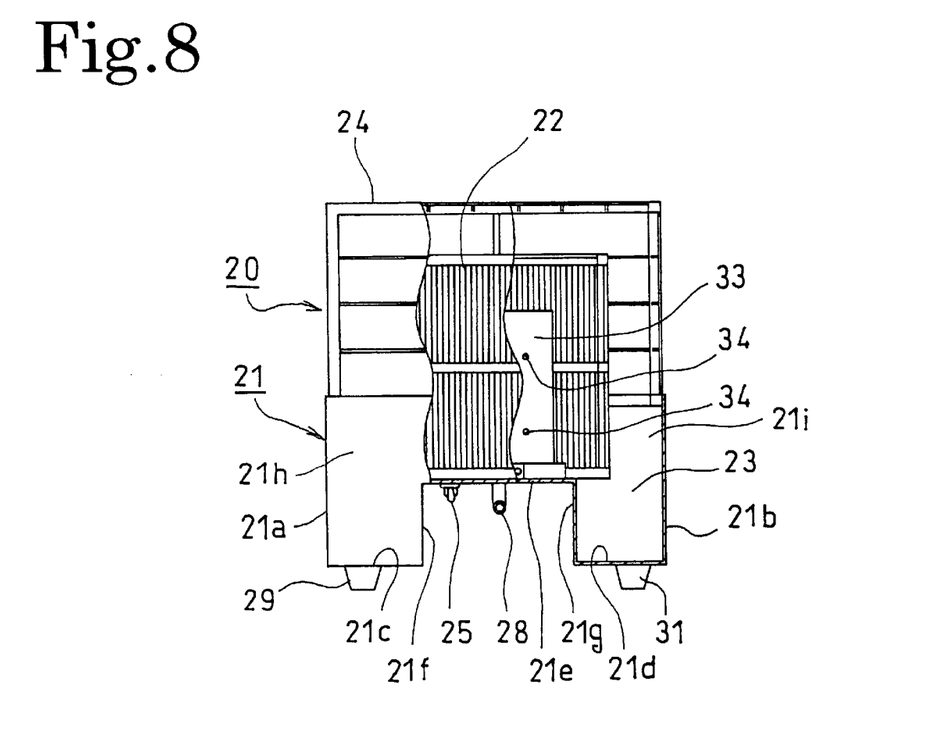
FIG. 8 is a right side view showing the mosquito killing apparatus according to the second embodiment.

The casing 21 is formed with thin metal plates whose outsides are coated with a white paint. The casing 21 includes a front plate 21a (see, FIG. 5 and FIG. 8) formed in a rectangular shape, a rear plate 21b (see, FIG. 8) formed in the same shape and size as the front plate 21 a, a first bottom plate 21c extending almost perpendicularly from a lower end of the front plate 21 a toward the rear plate 21b, a second bottom plate 21d extending almost perpendicularly from a lower end of the rear plate 21b toward the front plate 21a, a third bottom plate 21e formed slightly over the first and second bottom plates 21c, 21d between the first and second bottom plates 21c, 21d, a first upright plate 21f extending upright from the rear end of the first bottom plate 21c and connecting to the front end of the third bottom plate 21e, a second upright plate 21g extending upright from the rear end of the second bottom plate 21d and connecting to the rear end of the third bottom plate 21e, a right side plate 21h formed in a reversed rectangular U-shape, and a left side plate 21I formed in a reversed rectangular U-shape in substantially the same way. The upper ends of the front plate 21a, the rear plate 21b, the right side plate 21h, and the left side plate 21i are located slightly above the installation point of the third bottom plate 21e. The electroshock unit 22 is installed on a top surface of the third bottom plate 21e, as shown in FIG. 8, and the carbon dioxide (CO2) gas staying unit 23 constituting the invention is formed outside the electroshock unit 22. That is, the carbon dioxide (CO2) gas staying unit 23 is a portion surrounded by the front plate 21a, the rear plate 21b, the first and second plates 21f and 21g, the right side plate 21h, the left side plate 21i, and the top surfaces of the first to third bottom plates 21c, 21d, 21e.

Figure 7:
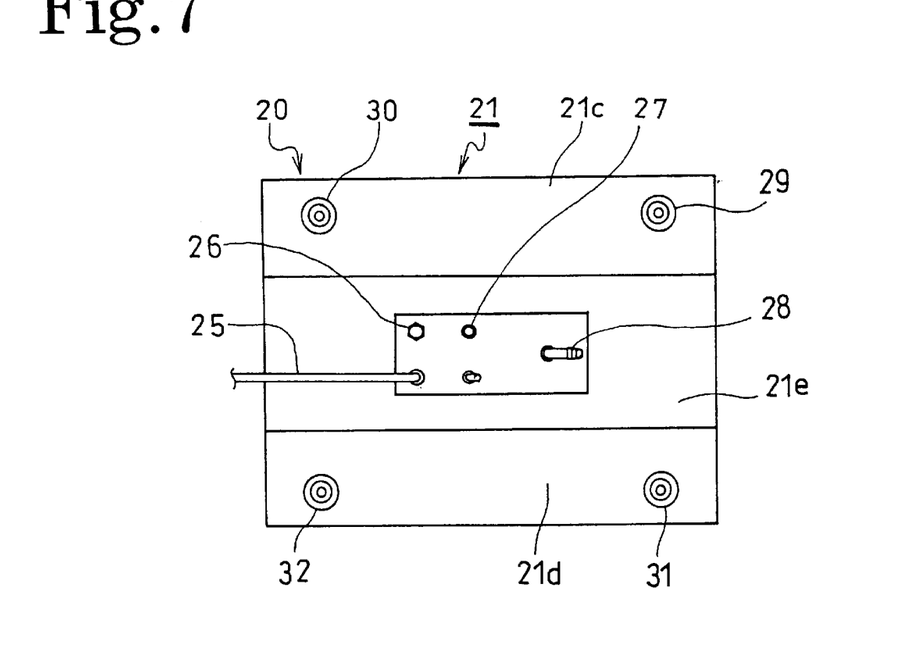
FIG. 7 is a bottom view showing the mosquito killing apparatus according to the second embodiment.

As shown in FIG. 7, a power supply cord 25, a fuse 26, a pilot lamp 27, and a tube 28 as a carbon dioxide (CO2) gas introduction inlet are arranged below the third bottom plate 21e. The tube 28 is a member to be coupled to a hose, not shown, which is connected to a high pressure carbon dioxide (CO2) gas container, not shown, serving as a carbon dioxide (CO2) gas generating means. A first leg 29 made of a rubber is secured to a right end on the lower surface of the first bottom plate 21c, and a second leg 30 made of a rubber is secured to a left end on the lower surface of the first bottom plate 21c. A third leg 31 made of a rubber is secured to a right end on the lower surface of the second bottom plate 21d, and a fourth leg 32 made of a rubber is secured to a left end on the lower surface of the second bottom plate 21d. As shown in FIGS. 5, 6, the electroshock unit 22 is made in substantially a rectangular shape as a whole and includes a black frame and a plurality of metal lines arranged inside the frame in a mesh shape with intervals of several millimeters. A heat dissipation box 33 is provided inside the electroshock unit 22. The heat dissipation box 33 is coated in a black color and has an electric heat, not shown, inside. A high voltage generation circuit, not shown, for applying a high voltage to the electroshock unit 22 is provided below the electric heater. The tube 28 as the carbon dioxide (CO2) gas introduction inlet is connected below the heat dissipation box 33, and the carbon dioxide (CO2) gas supplied from the carbon dioxide (CO2) gas container is supplied inside the heat dissipation box 33. Plural carbon dioxide (CO2) gas discharging openings 34 are formed in the top surface and side surfaces of the heat dissipation box 33 for discharging outside the carbon dioxide (CO2) gas supplied inside the heat dissipation box 33.

The protection cover 24 is detachably attached to the top ends of the front plate 21a, the rear plate 21b, the right side plate 21h, and the left side plate 21i, which constitute the casing 21. The protection cover 24 is formed in a box shape by five nets through which mosquitoes can easily enter inside but fingers of human beings cannot pass. It is to be noted that two switches, not shown, through which currents flow when the protection cover 24 is attached, are placed on the casing 21, and that the high voltage is not applicable when the protection cover 24 is removed. The protection cover 24 is white. The structure and usage of the high voltage generating circuit for the mosquito killing apparatus 20 according to this second embodiment is substantially the same as those of the mosquito killing apparatus 1 according to the first embodiment described above, and the apparatus 20 can exterminate mosquitoes very effectively in substantially the same manner as the apparatus 1. Particularly, according to the mosquito killing apparatus 20 of the second embodiment, the carbon dioxide (CO2) gas staying unit 23 is formed inside the casing 21, so that the apparatus can reduce the number of parts and can be produced with less costs.

Figure 9:
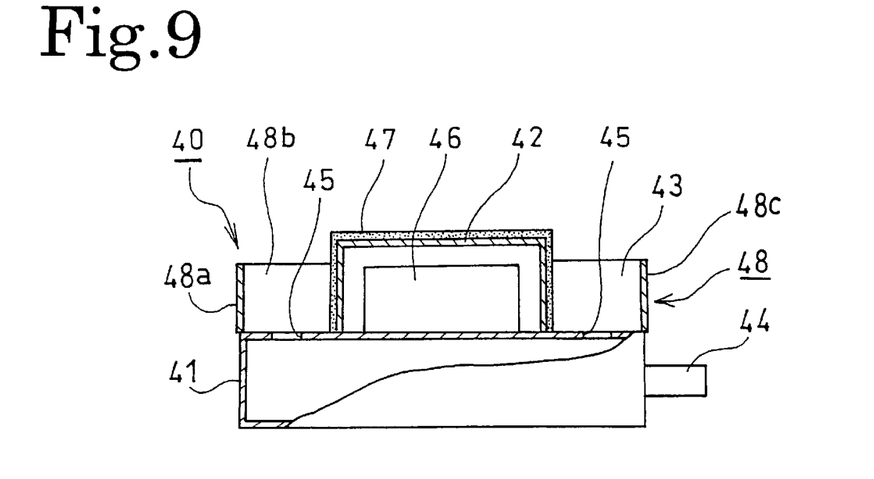
FIG. 9 is a front view showing a mosquito killing apparatus according to a third embodiment of the invention.

Referring to the drawings, a mosquito trapping apparatus according to the third embodiment is described. This mosquito trapping apparatus 40 is an apparatus for trapping mosquitoes with an adhesive agent upon attracting the mosquitoes, and as shown in FIG. 9, the apparatus includes a casing 41, a heat dissipation box 42 formed on a top surface of the casing 41, and a carbon dioxide (CO2) gas staying unit 43 formed around the heat dissipation box 42.

The casing 41 has an exterior in a rectangular shape made of a white resin and a hollow interior. An end of a tube 44 as a carbon dioxide (CO2) gas introduction inlet is secured to the side surface of the casing 41. The tube 44 is coupled to a carbon dioxide (CO2) gas generating means for supplying carbon dioxide (CO2) gas to the inside of the casing 41 through a hose not shown. Plural carbon dioxide (CO2) gas discharging openings 45 are formed in the top surface at the edge of the casing 41 for discharging the carbon dioxide (CO2) gas supplied inside the casing 41 to the vicinity of the heat dissipation box 42. The heat dissipation box 42 is detachably attached to the center of a top surface of the casing 41. The heat dissipation box 42 has an opening on a lower side of the box, and a space capable of containing a portable warmer 46 for generating heat inside. The portable warmer 46 is a disposable warmer which is available commercially and contains iron powders in an gas permeating inner sack. The portable warmer 46 is sold in a state that the warmer is contained in an outer sack, not shown, opened to start using the warmer, and is made to generate heat by rapidly oxidizing the iron powders in the inner sack upon contacting to the air when the sealing of the outer sack is broken. A sticky sheet 47 is made to adhere to an outer surface of the heat dissipation box 42. The sticky sheet 47 is colored in black and coated with a sticky agent having a sticking force such that mosquitoes cannot fly again when stopping on the sheet. The sticky agent, not shown, is added with black pigments or is transparent. The sticky sheet 47 is a sticky body as an element of the invention. A frame 48 is formed on an edge of the top surface of the casing 41 as to surround the heat dissipation box 42 with a height lower than the height of the heat dissipation box 42. The frame 48 is constituted of first to third upright plates 48a to 48c, and a fourth upright plate not shown. A space surrounded by the first to third upright plates 48a to 48c, the fourth upright plate not shown, the top surface of the casing 41, and the outer round surface of the sticky sheet 47 is the carbon dioxide (CO2) gas staying unit 3 according to the invention. That is, in this mosquito trapping apparatus 40, the carbon dioxide (CO2) gas staying unit 43 is formed outside the heat dissipation box 42.

Now, a method of using this mosquito trapping apparatus 40 according to the third embodiment is briefly described. This apparatus 40 can be installed in any place regardless indoors or outdoors, in the same manner as the mosquito killing apparatus in the first embodiment as described above, and further, the apparatus 40 does not require any power source, so that the apparatus 40 can be installed in a place where no electric power is available. Where the installation place is determined, the portable warmer 46 is taken out of the outer sack, not shown, to generate heats around the sticky sheet 47. A carbon dioxide (CO2) gas generating means such as a high pressure carbon dioxide (CO2) gas container, not shown, is connected to a hose, not shown, to the tube 44, and the carbon dioxide (CO2) gas is supplied to the inside of the casing 41. The carbon dioxide (CO2) gas supplied inside the casing 41 is moved up in being heated by the portable warmer 46 and discharged gradually from the carbon dioxide (CO2) gas discharging openings 45. Because the carbon dioxide (CO2) gas staying unit 43 is formed around the sticky sheet 47, and because the specific gravity of carbon dioxide (CO2) gas is heavier than that of the air, the carbon dioxide (CO2) gas discharged around the sticky sheet 47 stays and is the carbon dioxide (CO2) gas staying unit 43 in not immediately dispersing in the open air.

According to this mosquito trapping apparatus 40 of the third embodiment, heat and carbon dioxide (CO2) gas are generated around the mosquito trapping apparatus 40, and mosquitoes are attracted around the mosquito trapping apparatus 40. The attracted mosquitoes stop on the sticky sheet 47. Because the external surface of the sticky sheet 47 has the coated sticky agent having the sticky force such that mosquitoes cannot fly again when stopping on the sheet, the mosquito captured on the sticky sheet 47 once cannot fly again and dies later. Particularly, in the mosquito trapping apparatus 40, the heat dissipation box 42 and the sticky sheet 47 are painted black for easily generating radiation heat and having a large infrared radiation amount, while the casing 41 and the carbon dioxide (CO2) gas staying unit 43 are white not readily generating radiation heat and having a small infrared radiation amount. The attracted mosquitoes therefore stop on the sticky sheet 47 without stopping on the casing 41 and the frame 48, so that the attracted mosquitoes can surely be captured. Where the surface of the sticky sheet 47 is covered with trapped mosquitoes, or where the surface of the sticky sheet is dried as unable to trap mosquitoes, the sticky sheet 47 is peeled off and replaced with a new one. Therefore, the mosquito trapping apparatus 40 brings no risk when a human being touches by his hand the trapping means to replace the sticky sheet 47, and the mosquito trapping apparatus 40 can be maintained very easily by replacing the sticky sheet 47 with a new one.

Figure 10:
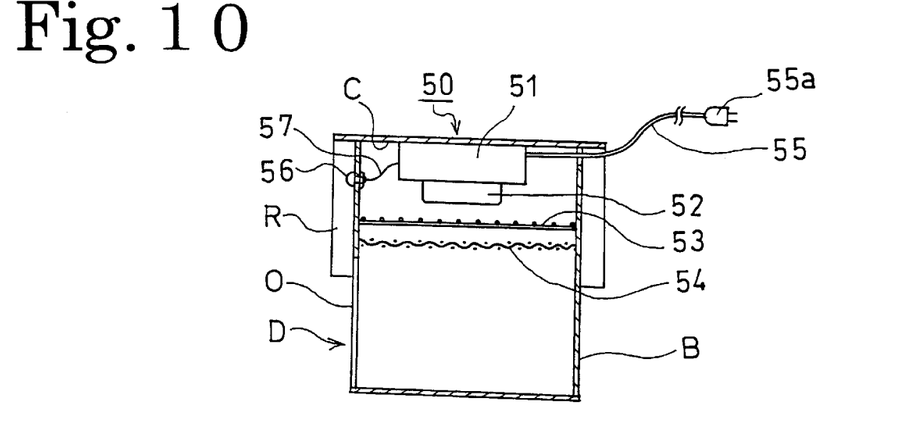
FIG. 10 is a right side view showing a mosquito killing apparatus according to a fourth embodiment of the invention.
Figure 11:
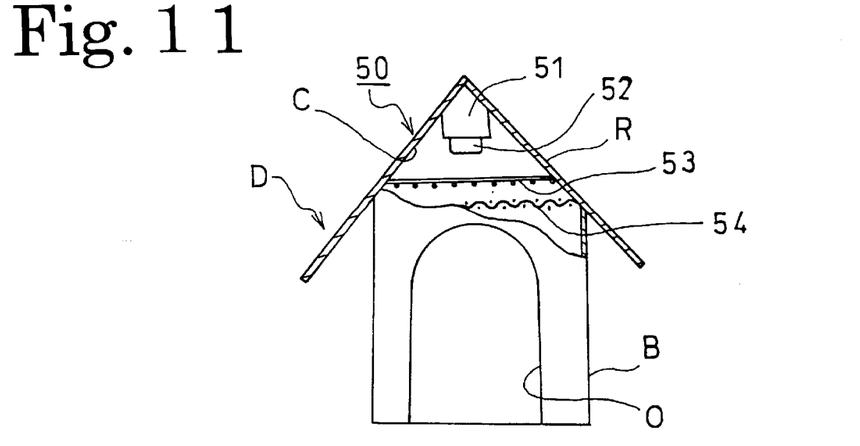
FIG. 11 is a front view showing the mosquito killing apparatus according to the fourth embodiment.

A mosquito killing apparatus 50 according to a fourth embodiment is described. This mosquito killing apparatus 50 is for exterminating mosquito living mainly in a garden of a house in which animals such as dogs are bred. As shown in FIGS. 10, 11, the mosquito killing apparatus 50 includes a high voltage generating circuit 51 formed on a ceiling of a doggy house D, an electric heater 52 formed on a lower surface of the high voltage generating circuit 51, an electroshock unit 53 formed below the electric heater 52, and a protection cover 54 formed below the electroshock unit 53.

The doggy house D is a known structure having a gable roof R over a box B, and an opening O in a reverse U-shape is formed as the entrance and exit of a dog or dogs. A ceiling surface C is formed on a top side of the inside of the roof R, and the high voltage generating circuit 51 is placed on a summit of the ceiling surface C. The outer and inner surfaces of the doggy house D is painted in white. The high voltage generating circuit 51 is a device to apply a high voltage to the electroshock unit 53, and a power supply cord 55 on a tip of which an AC plug 55a is attached is provided on an end side of the high voltage generating circuit 51. The power supply cord 55 extends outside through a hole not shown bored in the back of the box B and is capable of connecting to the power supply installed on an external wall or the like of the house. A pilot lamp 56 is attached over the opening O on a front side of the box B. This pilot lamp 56 is connected to the other end of the high voltage generating circuit 51 through a conductive line 57.

The electric heater 52 is formed on the lower surface of the high voltage generating circuit 51 and is a member to generate heat in the doggy house D, where painted with a black paint. The electroshock unit 53 is formed below the electric heater 52 at a middle portion of the ceiling surface C. The electroshock unit 53 is constituted of a frame not shown and a plurality of metal lines arranged in a grid or mesh shape on the frame. The color of the frame is black as well as the electric heater 52. The protection cover 54 is formed below the electroshock unit 53 on a lower end side of the ceiling surface C. The protection cover 54 is detachable as to allow cleaning works on the electroshock unit 53 and the like, and is formed in a mesh shape having intervals that mosquitoes can easily enter in but ears or tails of dogs cannot pass through. A switch to be powered upon placement of the protection cover 54 is formed on the box B, and no high voltage applies to the electroshock unit 53 where the protection cover 54 is removed. The protection cover 54 is painted in white.

A method for using this mosquito killing apparatus 50 according to the fourth embodiment is briefly described. First, the AC plug 55a is coupled to a consent not shown formed on the external wall or the like of the house. The pilot lamp 56 is thereby turned on, and the electric heater 52 generates heats to warm up the inside of the doggy house D while the high voltage applies to the electroshock unit 53. The mosquito killing apparatus 50 is not connectable to any carbon dioxide (CO2) gas generating apparatus, but a dog or dogs, not shown, which live in the doggy house D are utilized as a carbon dioxide (CO2) gas generating means. That is, the heats generated at the electrical heater 52 and carbon dioxide (CO2) gas generated from the dog are used as an attracting means, thereby attracting mosquitoes in the doggy house D. The electric heater 52 and the frame of the electroshock unit 53 are black where the protection cover 54 and the interior of the doggy house D are white, so that mosquitoes attracted inside the doggy house D are further enticed by the electrical heater 52 and electrocuted upon contact with the electroshock unit 53 after passing through the protection cover 54. According to the above mosquito killing apparatus 50, the mosquitoes living in the garden of a house are effectively exterminated, and the apparatus also can effectively prevent the mosquitoes from entering in the house because the mosquitoes are attracted in the doggy house D. Since mosquitoes living in the garden of a house are very effectively exterminated, and since the living density of the mosquitoes becomes small, dogs as important pets for human beings can escape from danger such that the mosquitoes suck blood of those dogs, and dogs can avoid a situation to be infected with contagious diseases such as filariasis or the like, which are communicable via mosquitoes. No particular carbon dioxide (CO2) gas generating apparatus is necessary to be prepared and used, so that this apparatus 50 can operate with reduced costs.

Figure 12:
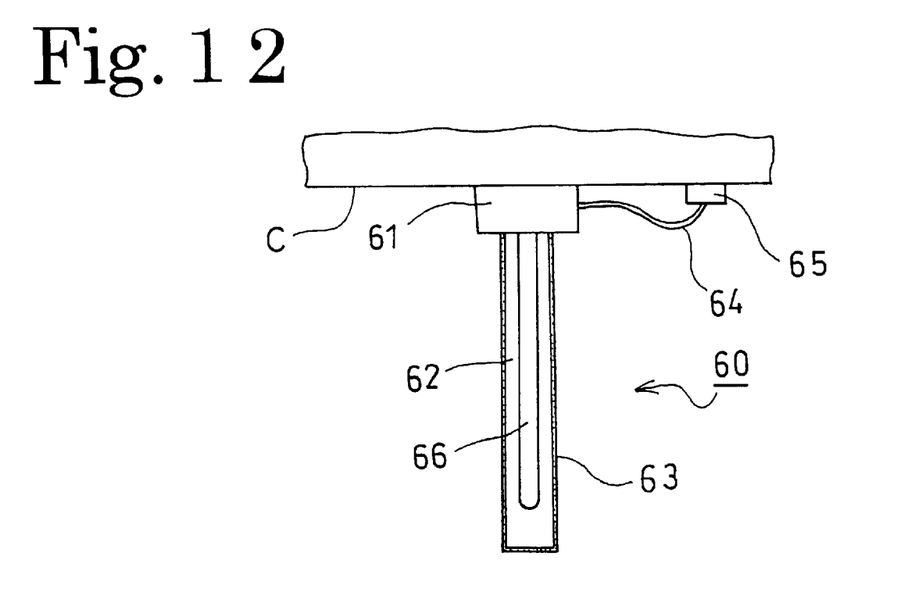
FIG. 12 is a front view showing a mosquito trapping apparatus according to a fifth embodiment of the invention.

A mosquito trapping apparatus according to fifth embodiment is described. The mosquito trapping apparatus 60 traps mosquitoes while pending from a ceiling of a house, and as shown in FIG. 12, includes a heating controller 61 formed on a ceiling surface C of a house, a heat dissipation box 62 formed on a lower surface of the heating controller 61, and a sticky sheet 63 formed on an outer round surface of the heat dissipation box 62.

The heating controller 61 has an exterior in white and is a device to control the temperature of an electric heater as described below incorporated in the heat dissipation box 62. A power supply cord 64 is provided on a side surface of the heating controller 61. This power supply cord 64 is structured to be coupled to a sealing socket 65 formed near the heating controller 61. The heat dissipation box 62 is pending from the lower surface of the heating controller 61, and contains the electric heater 66 inside. The electric heater 66 is structured to generate heat upon connecting the power supply cord 64 to the sealing socket 65. The sticky sheet 63 is detachably attached to an outer surface of the heat dissipation box 62. The sticky sheet 63 is substantially the same as the sticky sheet 43 illustrated for the mosquito trapping apparatus in the third embodiment, colored in black, and coated with a sticky agent having a sticky force such that mosquitoes cannot fly again when stopping on the sheet.

Figure 13:
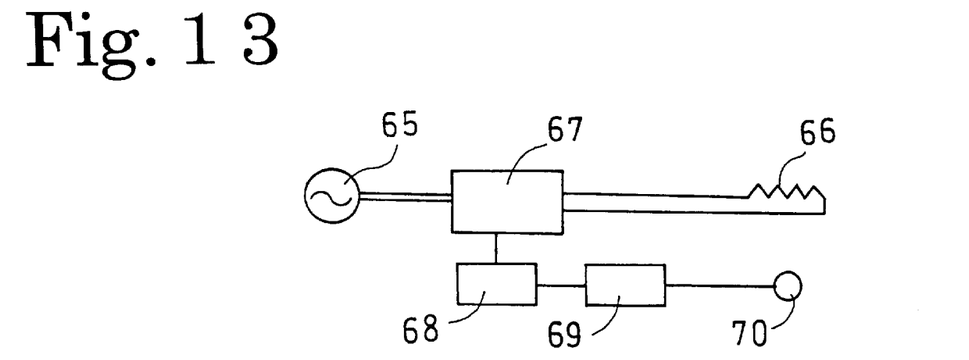
FIG. 13 is a circuit diagram showing a circuit structure of temperature control for an electronics heater in the mosquito trapping apparatus according to the fifth embodiment.
Figure 14:
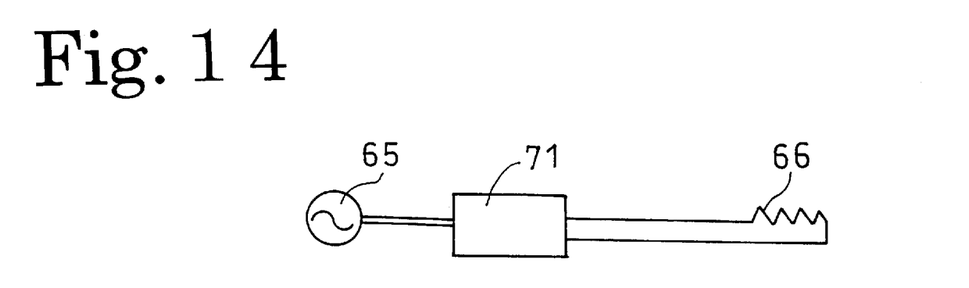
FIG. 14 is a circuit diagram showing another circuit structure of temperature control for the electronics heater in the mosquito trapping apparatus according to the fifth embodiment.

A system of the heating controller 61 for controlling the temperature of the electric heater 66 is briefly described next. In FIG. 13, numeral 67 represents a thyristor; numeral 68 represents a controlling section; numeral 69 represents a detector; numeral 70 represents a thermistor. When the power supply cord 64 is connected to the sealing socket 65, the apparatus is powered on to render the electric heater 66 enter in a heat generating state. The heat radiated from the electric heater 66 transmitted to the thermistor 70, and the temperature change in the thermistor 70 is detected by the detector 69, which transmits the detection result to the controlling section 68. The controlling section 68 controls the switching operation of the thyristor 67. The controlling section 68 thereby can maintain the temperature of heat radiated from the electric heater 66 in a proper temperature range. The apparatus can use a triac instead of a thyristor 67. The temperature control of the electric heater 66 can be done using a system to open and close the circuit upon detecting temperature changes in a prescribed range in use of a bimetal 71 as shown in FIG. 14.

The mosquito trapping apparatus 60 according to the fifth embodiment is used in being attached to the ceiling C of a house and can capture effectively mosquitoes in the house with the sticky sheet 63 upon attracting the mosquitoes with carbon dioxide ($CO_2$) gas produced by respiration of human beings and heats radiated from the heat dissipation box 62. This apparatus, as different from conventional mosquito-repellent incenses and electronic mosquito-repellent devices used indoors, is harmless against human bodies because of its drug free nature, and never causes damages on eyes or throat even when used continuously. Since the sticky sheet 63 captures mosquitoes, the dead bodies of the mosquitoes are never scattered indoors, so that the rooms can be cleaned up easily, and so that the apparatus can be used continuously only be replacing the sticky sheet 63 with a new one.

Figure 15:
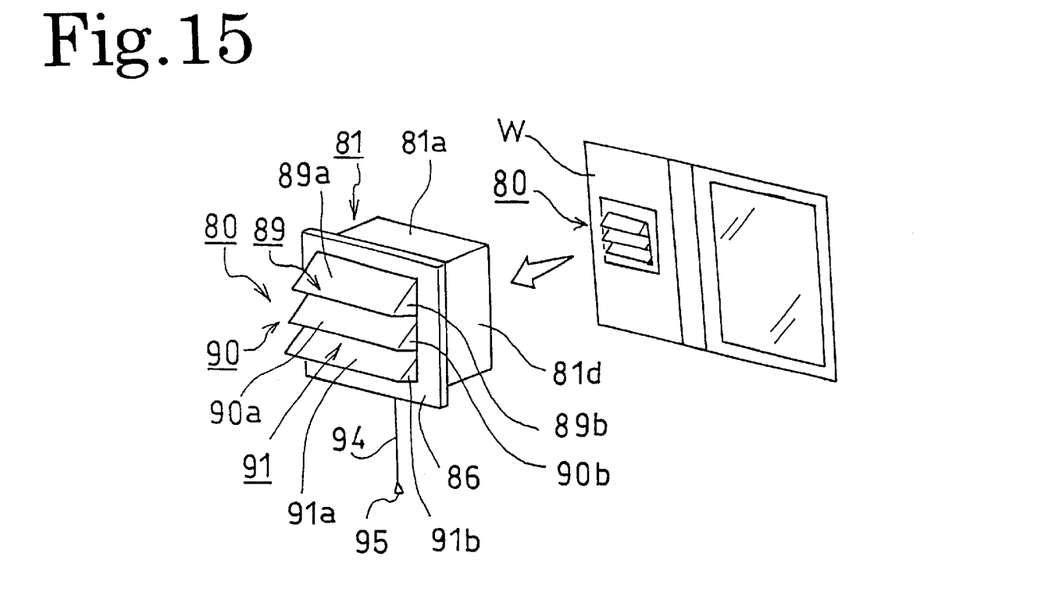
FIG. 15 is a perspective view showing a mosquito trapping apparatus according to a sixth embodiment of the invention.
Figure 16:
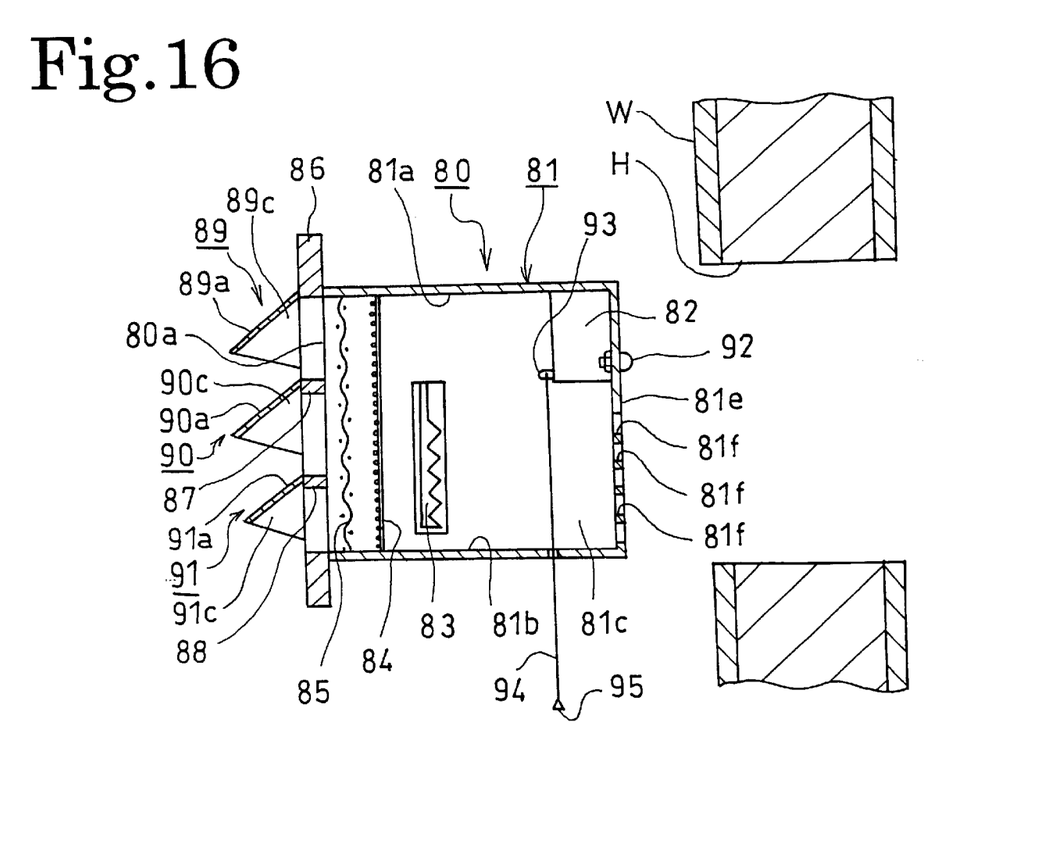
FIG. 16 is a right side view showing the mosquito trapping apparatus according to the sixth embodiment.

A mosquito killing apparatus 80 according to a sixth embodiment is described. This mosquito killing apparatus 80 is used as shown in FIG. 15 where installed on a wall W of a house not shown. As shown in FIG. 16, the apparatus 80 includes a housing 81 installed in an attachment aperture H formed on the outer wall W, a power supply 82 formed in the housing 81, an electric heater 83, an electroshock unit 84, and a protection cover 85.

The housing 81 is formed in a rectangular shape having one opening on a side of the outdoor and is constituted of a top plate 81*a*, a bottom plate 81*b*, a left side plate 81*c*, and a right side plate 81*d*, and a rear plate 81*e*. Many ventilation holes 81*f* are formed in a lower half of the rear plate 81*e*. Those ventilation holes 81*f* collectively serve as the other opening as one of the elements of the invention. A flange portion 86 is formed on an edge of the housing 81 on an indoor side. One partition plate 87 whose one end is secured to a front end side of the left side plate 81*c* and whose other end is secured to a front end side of the right side plate 81*d* is provided on a front side of the housing 81, and the other partition plate 88 whose one end is secured to a front end side of the left side plate 81*c* and whose other end is secured to a front end side of the right side plate 81*d* is provided below the one partition plate 87. A first protection plate 89 is secured to a tip of the top plate 81*a*. This first ceiling plate 89 is, as shown in FIG. 15 and FIG. 16, constituted of a first front plate 89*a* formed in a rectangular shape projected in forming a gentle slope from the proximal end to the distal end, a first side cover 89*b* formed from a right end of the first front plate 89*a* to the front top of the right side plate 81*d*, and a second side cover 89*c* formed from a left end of the first front plate 89*a* to the front top of the left side plate 81*c*. A second protection plate 90 is formed on the one partition plate 87. The second protection plate 90 is constituted of a second front plate 90*a* formed in a rectangular shape projected in forming a gentle slope in substantially the same manner as the first front plate 89*a* from the front of the one partition plate 87, a third side cover 90*b* formed from a right end of the second front plate 90*a* to the front middle portion of the right side plate 81*d*, and a fourth side cover 90*c* formed from a left end of the front plate 90*a* to the front middle portion of the left side plate 81*c*. A third protection plate 91 is formed on the other partition plate 88. The third protection plate 91 is constituted of a third front plate 91*a* formed in a rectangular shape projected obliquely downward from the front of the other partition plate 88, a fifth side cover 91*b* formed from a right end of the third front plate 91*a* to the front bottom of the right side plate 81*d*, and a sixth side cover 91*c* formed from a left end of the third front plate 91*a* to the front bottom of the left side plate 81*c*. Those first to third protection plates 89, 90, 91 prevent rains and the like from entering in the housing 81 and are members for preventing fingers from inadvertently entering in the housing 81.

The power supply 82 is formed around a junction between the top plate 81*a* and the rear plate 81*e* constituting the housing 81, and a pilot lamp 92 is attached on an indoor side of the power supply 82. The pilot lamp 92 is projected inside the house through a through hole not shown formed in the rear plate 81*e*. A pulling switch 93 is attached to a lower end of the power supply 82. The pulling switch 93 is attached to a cord 94 for control, and a knob 95 is formed on an end of the cord 94. The cord 94 and the knob 95 are located at a space below the housing in extending through a small hole formed in the bottom plate 81*b* constituting the housing 81.

The electrical heater 83 is supported by a support not shown at a position slightly closer to the outdoor side of a center of the housing 81. The electrical heater 83 is a device for attracting mosquitoes in dispersing generated heat around the vicinity of the heater upon being turned on in substantially the same manner as the respective electrical heaters illustrated in the mosquito killing apparatuses and the mosquito trapping apparatuses in the above first to fifth embodiments. The electroshock unit 84 is formed outside the electric heater 83. The electroshock unit 84 includes a frame, not shown, and a plurality of metal lines arranged in a grid or mesh shape on the frame. The protection cover 85 has a mesh or grid with intervals allowing mosquitoes to enter inside easily but rendering fingers of human beings impossible to pass through. When the protection cover 85 is removed, no high voltage would be applied to the electroshock unit 83. The electric heater 83 and the frame of the electroshock unit 84 are black for easily stopping of mosquitoes, but the housing 81, the protection cover 85, and the first to third protection plates 89 to 91 are white.

A using method and advantages of this mosquito killing apparatus 80 according to the sixth embodiment is briefly described. The mosquito killing apparatus 80 uses, as means for attracting mosquitoes, heat dispersed inside the room from the electric heater 83, as well as carbon dioxide ($CO_2$) gas discharged from human bodies in the room and dispersed outside the room through the ventilation holes. When the apparatus is used, the knob 95 is pulled down to turn on the power of the apparatus. The pilot lamp 92 is turned on, the electric heater 83 is powered on to generate heat, while a high voltage is supplied to the electroshock unit 84. The mosquitoes attracted by the heat and carbon dioxide ($CO_2$) gas pass through the intervals of the first to third protection plates 89, 90, 91, and try to enter in the room through the one opening 80a. The mosquitoes pass by the protection cover 85 and electrocuted when stopping at the electroshock unit 84. That is, the mosquitoes living in the house and the vicinity of the house are attracted by the heat and carbon dioxide ($CO_2$) gas, come together around the mosquito killing apparatus 80, and try to enter inside the mosquito killing apparatus 80, so that mosquitoes may not enter in the room from windows or the like, and so that the mosquitoes that tried to enter in the mosquito killing apparatus 80 are electrocuted by the electroshock unit. Therefore, this apparatus can prevent harms that mosquitoes living outdoors come in a house to suck blood of the human beings from occurring effectively.

It is to be noted that although in the mosquito killing apparatus 1, 20, 50 according to the above first, second, and fourth embodiments, the high pressure carbon dioxide ($CO_2$) gas containers are used as carbon dioxide ($CO_2$) gas generating means, the mosquito killing apparatus according to this invention can use other carbon dioxide ($CO_2$) gas generating apparatuses other than the high pressure carbon dioxide ($CO_2$) gas container in accordance with situations for use. For example, dry ices may be contained in a container, which includes a container body molded of an insulating material not shown, and a lid on which a tube is formed for communication between the inside and the outside of the container body, and the tube may be coupled with a hose, not shown, to a carbon dioxide ($CO_2$) gas introduction inlet as illustrated in the respective above embodiments. A container may be used, instead of a container containing dry ices, in which carbon dioxide ($CO_2$) gas is produced by chemical reactions where agents such as calcium carbonate are filled in a container containing water, and in which the carbon dioxide ($CO_2$) gas is discharged through a tube formed in the lid. Another container may be used whose inside is formed of a glass wool on which the carbon powder fuel is burned to generate carbon dioxide ($CO_2$) gas. Moreover, a carbon dioxide ($CO_2$) gas supply apparatus, instead of a high pressure carbon dioxide ($CO_2$) gas container, having a container containing agents such as a calcium carbonate, a fixed amount dispenser for dispensing a fixed amount of the agent, and a water tank for producing carbon dioxide ($CO_2$) gas upon chemical reaction between the supplied agent and water, may be coupled to the carbon dioxide ($CO_2$) gas introduction inlet. For a device or unit requiring the power supply, such a device can use not only a power source of alternative currents but also a battery. The mosquito trapping apparatuses 40, 60 according to the third and fifth embodiments, though using the sticky sheets as sticky surfaces, may use, instead of sticky sheets, a sheet on a surface of which a sticky agent is coated or sprayed.

Although in the mosquito killing apparatuses 1, 20, 50, 80 according to the above respective embodiments, the frames of the electroshock units 3, 22, 53, 84 and the heat dissipation boxes 11, 33, and the like are black while the casing 2 is white and the frame 14 is transparent, and in the mosquito trapping apparatuses 40, 60, the sticky sheets 47, 63 as well as the heat dissipation box 42 are black while the casing 41, the heating controller 61, and the like are white, this invention can be effective at least if the heater and/or either of the electroshock unit and sticky body has a lower lightness than anywhere else in the apparatus. For example, the electroshock unit and the like can be not only black but also brown, navy blue, violet, green, and so on, while the casing, the cover, the frame, and members forming the carbon dioxide ($CO_2$) gas staying unit may be not necessary in white and can be thin yellow, cyan, or the like, as far as having a higher lightness than the color of the electroshock unit.

As apparent from the above descriptions for the mosquito killing apparatuses and the mosquito trapping apparatuses according to the above respective embodiments, first, the mosquito killing apparatus according to this invention has a very high effect to attract mosquitoes because the apparatus uses the heat and carbon dioxide ($CO_2$) gas together as a means for attracting mosquitoes. The carbon dioxide ($CO_2$) gas generating means is not particular one incorporated in advance inside the apparatus but is structured to be able to use a carbon dioxide ($CO_2$) gas generating means to couple with the carbon dioxide ($CO_2$) gas introduction inlet, so that carbon dioxide ($CO_2$) gas generating means of various types suitable for using object and using place can be used upon selection. This also makes the mosquito killing apparatus itself compact and light in weight, thereby reducing the production costs. Since a carbon dioxide ($CO_2$) gas staying unit is formed around the electroshock unit, the carbon dioxide ($CO_2$) gas discharged around the electroshock unit does not disperse in the open air immediately. Therefore, the apparatus does not require a large amount of carbon dioxide ($CO_2$) gas and can operate with reduced costs.

The mosquito killing apparatus according to another aspect of the invention is structured to flow carbon dioxide ($CO_2$) gas around the electroshock unit upon heating the carbon dioxide ($CO_2$) gas supplied inside the electroshock unit by means of a heater formed inside the electroshock unit and the carbon dioxide ($CO_2$) gas staying unit is formed as to stand upright around the electroshock unit. The flown carbon dioxide ($CO_2$) gas stays at the bottom of the carbon dioxide ($CO_2$) gas staying unit, and because the specific gravity of the carbon dioxide ($CO_2$) gas is heavier than that of the air, the carbon dioxide ($CO_2$) gas can stay for a long time.

The mosquito killing apparatus according to yet another aspect of the invention is structured to entice mosquitoes by utilizing carbon dioxide ($CO_2$) gas generated by respiration of animals in an animal house as well as a heater formed at the killing apparatus, so that the apparatus is not required to use any carbon dioxide ($CO_2$) gas generating means and can be used inexpensively. The apparatus can effectively exterminate the mosquitoes living around the animal house, and can prevent a situation that the mosquitoes suck blood of the animals from occurring, so that a situation that the animals are infected with diseases transmitted by such mosquitoes can be prevented.

According to another mosquito killing apparatus, the apparatus is structured to be used upon attached in a aperture formed on a wall of a house, and the apparatus can attract mosquitoes effectively living around the house by the heater and carbon dioxide ($CO_2$) gas produced by respiration of human being located indoors. The attracted mosquitoes come together around the mosquito killing apparatus and try to enter in the mosquito killing apparatus, so that mosquitoes may not enter in the house from windows, and so that the mosquitoes tried to enter in the mosquito killing apparatus will be electrocuted by the electroshock unit. Therefore, the mosquitoes living around houses can be effectively exterminated, and the apparatus can prevent harm that mosquitoes enter in houses to suck blood of human beings from occurring.

In accordance with the mosquito trapping apparatus of the invention, the apparatus has a very high effect to attract mosquitoes because the heat and carbon dioxide (CO2) gas are used together as a means for attracting mosquitoes, and has a structure that the carbon dioxide (CO2) gas generating means is not a particular one incorporated in advance inside the apparatus and that the apparatus can be used by connecting the carbon dioxide (CO2) gas generating means to the carbon dioxide (CO2) gas introduction inlet, so that carbon dioxide (CO2) gas generating means of various types suitable for using object and using place can be used upon selection. This also makes the mosquito killing apparatus itself compact and light in weight, thereby reducing the production costs. Since a carbon dioxide (CO2) gas staying unit is formed around the electroshock unit, the carbon dioxide (CO2) gas discharged around the electroshock unit does not disperse in the open air immediately. Therefore, the apparatus does not require a large amount of carbon dioxide (CO2) gas and can operate with reduced costs.

With another mosquito trapping apparatus of the invention, the apparatus is used upon attached to a ceiling of a room and has a structure that the apparatus traps mosquitoes in the room with a sticky body upon attracting mosquitoes by the carbon dioxide (CO2) gas generated by respiration of human beings and heat dispersing from the heater, so that the apparatus can trap the mosquitoes entering in the room effectively. This apparatus, as different from conventional mosquito-repellent incenses and electronic mosquito-repellent devices used indoors, is harmless against human bodies because of its drug free nature, and never causes damages on eyes or throat even where used continuously. Since the sticky surface formed on a surface on the sticky body captures mosquitoes, the dead bodies of the mosquitoes are never scattered indoors, so that the rooms can be cleaned up easily, and so that the apparatus can be used continuously only be replacing the sticky body with a new one.

According to other mosquito killing and trapping apparatuses of the invention, since the heater and/or either of the electroshock unit and sticky body has a lower lightness than anywhere else in each apparatus, the attracted mosquitoes are surely electrocuted upon stopping on the electroshock unit or trapped while stopping on the sticky surface. Therefore, only few attracted mosquitoes can fly again without stopping on the electroshock unit or the sticky surface, and the apparatus can exterminate mosquitoes very effectively.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention should not be limited by the specification, but defined claims set forth below.

What is claimed is:

1. A mosquito killing apparatus comprising:

an electroshock unit having a high voltage potential difference;

a heater for generating heat;

discharging means for discharging carbon dioxide (CO2) gas around the electroshock unit;

a carbon dioxide (CO2) gas introduction inlet for connecting with a carbon dioxide (CO2) gas generating means which generates carbon dioxide (CO2) gas, the carbon dioxide (CO2) gas introduction inlet being coupled to the discharging means;

a protection cover arranged outside the electroshock unit for covering the electroshock unit; and a carbon dioxide (CO2) gas staying unit provided around the electroshock unit for staying the carbon dioxide (CO2) gas introduced from the carbon dioxide (CO2) gas introduction inlet around the electroshock unit, wherein the protection cover is mounted above the staying unit and the staying unit having solid vertical walls.

2. The mosquito killing apparatus according to claim 1, wherein the heater and the electroshock unit are darker than everything else in the apparatus.

* * * * *